United States Patent
Zhou

(10) Patent No.: US 9,335,806 B2
(45) Date of Patent: May 10, 2016

(54) POWER SUPPLY CIRCUIT FOR CENTRAL PROCESSING UNIT

(71) Applicant: ScienBiziP Consulting (Shen Zhen) Co., Ltd., Shenzhen (CN)

(72) Inventor: Hai-Qing Zhou, Shenzhen (CN)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 169 days.

(21) Appl. No.: 14/213,911

(22) Filed: Mar. 14, 2014

(65) Prior Publication Data

US 2015/0019883 A1    Jan. 15, 2015

(30) Foreign Application Priority Data

Jul. 15, 2013    (CN) .......................... 2013 1 0295212

(51) Int. Cl.
*G06F 1/26*    (2006.01)

(52) U.S. Cl.
CPC ........................... *G06F 1/26* (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | | |
|---|---|---|---|---|
| 2010/0162010 A1* | 6/2010 | Su | ............................ | H02M 1/34 713/300 |
| 2011/0095743 A1* | 4/2011 | Zhou | ...................... | G11C 5/147 323/290 |
| 2013/0138981 A1* | 5/2013 | Wang | .................... | G06F 1/3206 713/300 |
| 2013/0163293 A1* | 6/2013 | Zou | ...................... | H02M 3/1588 363/37 |
| 2013/0173934 A1* | 7/2013 | Fu | ....................... | G06F 11/3062 713/300 |
| 2013/0314010 A1* | 11/2013 | Gao | ........................ | H02P 7/245 318/400.06 |
| 2014/0077781 A1* | 3/2014 | Murakami | .............. | H02M 3/04 323/282 |
| 2014/0203793 A1* | 7/2014 | Lai | .......................... | H02M 1/44 323/283 |

\* cited by examiner

*Primary Examiner* — Zahid Choudhury
(74) *Attorney, Agent, or Firm* — Novak Druce Connolly Bove + Quigg LLP

(57) ABSTRACT

A power supply circuit for a central processing unit (CPU) includes a comparing circuit, first to third switch circuits, first and second compensation circuits, a pulse width modulation (PWM) controller, a first power circuit connected to a first output pin of the PWM controller, and a second power circuit connected to a second output pin of the PWM controller. When a motherboard operates normally, the comparing circuit outputs a first control signal to control the first and third switch circuits to be turned on. The second switch circuit is turned off. The first compensation circuit provides a compensation signal to the PWM controller. When the motherboard is powered off, the comparing circuit outputs a second control signal to control the first and third switch circuits to be turned off. The second switch circuit is turned on. The second compensation circuit provides a compensation signal to the PWM controller.

9 Claims, 1 Drawing Sheet

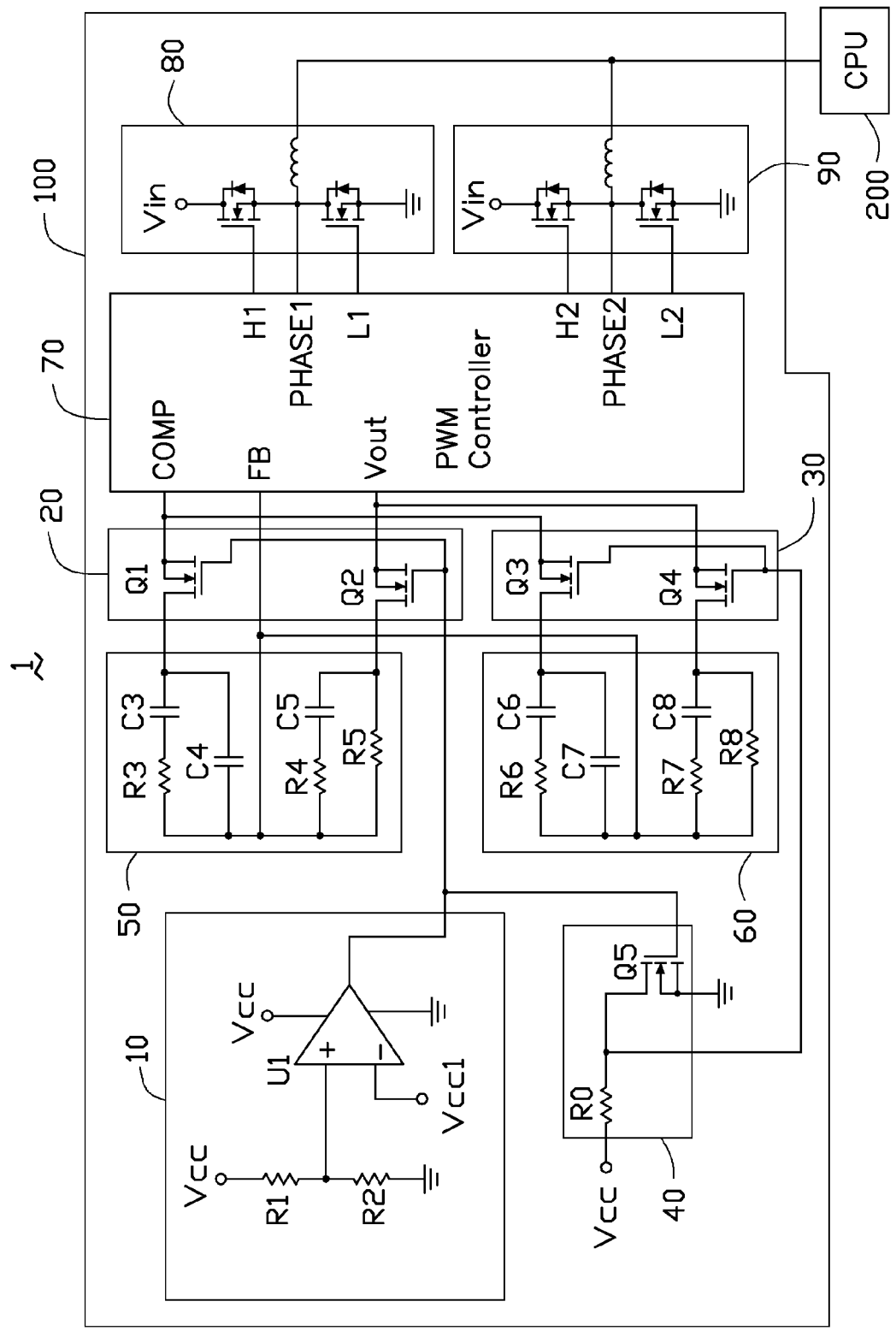

POWER SUPPLY CIRCUIT FOR CENTRAL PROCESSING UNIT

BACKGROUND

1. Technical Field

The present disclosure relates to power supply circuits, and particularly to a power supply circuit for providing voltage to a central processing unit (CPU).

2. Description of Related Art

Many power circuits are arranged on a motherboard of a computer for providing voltages to a CPU. Most if not all power circuits operate when the computer is powered on, but only one power circuit operates after the motherboard is powered off. Different combinations of power circuits provide voltages to the CPU when the motherboard operates in different states, so the need for compensation for variations in voltage can vary, and if not handled properly, voltage provided to the CPU may be unstable and may damage the CPU. Therefore, there is room for improvement in the art.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments.

The FIGURE is a circuit diagram of a power supply circuit for a central processing unit in accordance with an embodiment of the present disclosure.

DETAILED DESCRIPTION

The disclosure, including the drawing, is illustrated by way of example and not by way of limitation. References to "an" or "one" embodiment in this disclosure are not necessarily to the same embodiment, and such references mean at least one.

The FIGURE shows a power supply circuit 100 of the embodiment. The power supply circuit 100 is arranged on a motherboard of a computer 1, to provide voltages to a central processing unit (CPU) 200 of the computer 1. The power supply circuit 100 comprises a comparing circuit 10, a first switch circuit 20, a second switch circuit 30, a third switch circuit 40, a first compensation circuit 50, a second compensation circuit 60, a pulse width modulation (PWM) controller 70. In addition, a first power circuit 80 connected to a first output terminal of the PWM controller 70, and a second power circuit 90 connected to a second output terminal of the PWM controller 70.

When the computer 1 operates normally, the first and second power circuits 80 and 90 both operate. The comparing circuit 10 outputs a first control signal to the first and third switch circuits 20 and 40. The first and third switch circuits 20 and 40 are turned on. The second switch circuit 30 is off. The first compensation circuit 50 outputs a first compensation signal to the PWM controller 70 through the first switch circuit 20. The PWM controller 70 regulates duty cycle of pulse signals and outputs the regulated pulse signals to the first and second power circuits 80 and 90 according to the first compensation signal, to provide a stable voltage to the CPU 200. When the computer 1 is powered off, the first power circuit 80 operates and the second power circuit 90 does not operate. The comparing circuit 10 outputs a second control signal to the first and third switch circuits 20 and 40. The first and third switch circuits 20 and 40 are turned off. The second switch circuit 30 is turned on. The second compensation circuit 60 outputs a second compensation signal to the PWM controller 70 through the second switch circuit 30. The PWM controller 70 regulates duty cycle of a pulse signal and outputs the regulated pulse signal to the first power circuit 80 according to the second compensation signal, to provide a stable voltage to the CPU 200. In one embodiment, elements and theory of the first and second power circuits 80 and 90 are known.

The comparing circuit 10 comprises resistors R1 and R2, and a comparator U1. A non-inverting input terminal of the comparator U1 is connected to a power source Vcc through the resistor R1. The non-inverting input terminal of the comparator U1 is grounded through the resistor R2. An inverting input terminal of the comparator U1 is connected to a reference power source Vcc1. A power terminal of the comparator U1 is connected to the power source Vcc. A ground terminal of comparator U1 is grounded. An output terminal of the comparator U1 is connected to the first and third switch circuits 20 and 40. In the embodiment, the voltage of the non-inverting input terminal of the comparator U1 is less than the voltage of the inverting input terminal of the comparator U1.

The first switch circuit 20 comprises two electronic switches, n-channel field effect transistors (FETs) Q1 and Q2. A gate of the FET Q1 is connected to a gate of the FET Q2 and the output terminal of the comparator U1. A source of the FET Q1 is connected to an input output (I/O) pin COMP of the PWM controller 70. A drain of the FET Q1 is connected to the first compensation circuit 50. A source of the FET Q2 is connected to an I/O pin Vout of the PWM controller 70. A drain of the FET Q2 is connected to the first compensation circuit 50. An output pin PHASE 1 of the PWM controller 70 functions as the first output terminal of the PWM controller 70 and is connected to the CPU 200 through the first power circuit 80. An output pin PHASE2 of the PWM controller 70 functions as the second output terminal of the PWM controller 70 and is connected to the CPU 200 through the second power circuit 90.

The second switch circuit 30 comprises two electronic switches, n-channel FETs Q3 and Q4. A gate of the FET Q3 is connected to a gate of the FET Q4 and the third switch circuit 40. A source of the FET Q3 is connected to the I/O pin COMP of the PWM controller 70. A drain of the FET Q3 is connected to the second compensation circuit 60. A source of the FET Q4 is connected to the I/O pin Vout of the PWM controller 70. A drain of the FET Q4 is connected to the second compensation circuit 60.

The third switch circuit 40 comprises an electronic switch, n-channel FET Q5, and a resistor RO. A gate of the FET Q5 is connected to the output terminal of the comparator U1. A source of the FET Q5 is grounded. A drain of the FET Q5 is connected to the gates of the FETs Q3 and Q4, and also connected to the power source Vcc through the resistor R0.

The first compensation circuit 50 comprises resistors R3-R5 and capacitors C3-C5. A first end of the capacitor C3 is connected to the drain of the FET Q1. A second end of the capacitor C3 is connected to the drain of the FET Q2 through the resistors R3 and R4 and the capacitor C5 in that order. A first end of the capacitor C4 is connected to the drain of the FET Q1. A second end of the capacitor C4 is connected to a node between the resistors R3 and R4. A first end of the resistor R5 is connected to the drain of the FET Q2. A second end of the resistor R5 is connected to the node between the resistors R3 and R4. A feedback pin FB of the PWM controller 70 is connected to the node between the resistors R3 and R4.

The second compensation circuit 60 comprises resistors R6-R8 and capacitors C6-C8. A first end of the capacitor C6 is connected to the drain of the FET Q3. A second end of the capacitor C6 is connected to the drain of the FET Q4 through the resistors R6 and R7 and the capacitor C8 in that order. A first end of the capacitor C7 is connected to the drain of the FET Q3. A second end of the capacitor C7 is connected to a node between the resistors R6 and R7. A first end of the resistor R8 is connected to the drain of the FET Q4. A second end of the resistor R8 is connected to the node between the resistors R6 and R7. The feedback pin FB of the PWM controller 70 is connected to the node between the resistors R6 and R7. In one embodiment, the resistor R1 is a negative temperature coefficient thermistor where the resistance of the resistor R1 decreases as the temperature of the resistor R1 increases. The resistor R1 is located near an inductor in the second power circuit 90. In addition, resistances of the resistors R6-R8 are different from resistances of the resistors R3-R5 (they are shown on opposite sides of the box representing the power supply circuit 100 in the interest of clarity and simplicity). Capacitances of the capacitors C6-C8 are different from capacitances of the capacitors C3-C5, to make the compensation signal of the first compensation circuit 50 different from the compensation signal of the second compensation circuit 60.

In use, when the computer 1 operates normally, the first and second power circuits 80 and 90 operate. The inductor in the second power circuit 90 operates and emits heat. Resistance of the resistor R1 which is near the inductor goes down. The voltage of the power source Vcc is divided by resistor R1 and R2 and the divided voltage is then provided to the non-inverting input terminal of the comparator U1. The divided voltage of the non-inverting input terminal of the comparator U1 is greater than the reference power source Vcc1 of the inverting input terminal of the comparator U1. The comparator U1 outputs a high level signal. The FETs Q2, Q2, and Q5 are turned on. The FETs Q3 and Q4 receive low level signals from the drain of the FET Q5 and are turned off. The first compensation circuit 50 outputs the first compensation signal to the PWM controller 70 through the FETs Q1 and Q2. The PWM controller 70 regulates duty cycle of pulse signals and outputs the regulated pulse signals to the first and second power circuits 80 and 90 according to the first compensation signal. Two FETs of the first or second power circuits 80 and 90 are alternatively turned on or turned off for charging or discharging the inductor of the first or second power circuits 80 and 90, to provide a stable voltage to the CPU 200.

When the computer 1 is powered off, the first power circuit 80 operates and the second power circuit 90 does not operate. The PWM controller 70 only outputs a pulse signal to the first power circuit 80. The temperature of the resistor R1 near the inductor in the second power circuit 90 and the resistance of the resistor R1 are restored. The divided voltage of the non-inverting input terminal of the comparator U1 is less than the reference power source Vcc1 of the inverting input terminal of the comparator U1. The comparator U1 outputs a low level signal. The FETs Q1, Q2, and Q5 are turned off The FETs Q3 and Q4 receive high level signals from the power source Vcc and are turned on. The second compensation circuit 60 outputs a second compensation signal to the PWM controller 70 through the FETs Q3 and Q4. The PWM controller 70 regulates duty cycle of a pulse signal and outputs the regulated pulse signal to the first power circuit 80 according to the second compensation signal. The two FETs of the first power circuit 80 are alternatively turned on or turned off for charging or discharging the inductor of the first power circuit 80, to provide a stable voltage to the CPU 200.

The power supply circuit 100 uses different compensation circuits when the computer 1 works in different states. When the computer 1 operates normally, the first compensation circuit 50 outputs a first compensation signal to provide a stable voltage to the CPU 200. When the computer 1 is powered off, the second compensation circuit 60 outputs a second compensation signal to provide a stable voltage to the CPU 200. Therefore, the power supply circuit 100 can output stable voltages to the CPU 200 when the computer 1 operates normally or is powered off, to prevent the CPU 200 from being damaged.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A power supply circuit applicable to a central processing unit (CPU) of a computer, the power supply circuit comprising:

a pulse width modulation (PWM) controller comprising a first output terminal and a second output terminal;

a first power circuit connected to the first output terminal of the PWM controller and the CPU;

a second power circuit connected to the second output terminal of the PWM controller and the CPU, the second power circuit comprising an inductor;

a comparing circuit comprising first and second resistors, and a comparator, wherein a non-inverting input terminal of the comparator is connected to a power source through the first resistor, the non-inverting input terminal of the comparator is grounded through the second resistor, an inverting input terminal of the comparator is connected to a reference power source, a power terminal of the comparator is connected to the power source, a ground terminal of comparator is grounded, the first resistor is a negative temperature coefficient thermistor and located near the inductor in the second power circuit;

a first switch circuit connected to an output terminal of the comparator and the PWM controller;

a second switch circuit connected to the PWM controller;

a third switch circuit connected to the output terminal of the comparator and the second switch circuit;

a first compensation circuit connected to the first switch circuit; and a second compensation circuit connected to the second switch circuit;

wherein when the computer operates normally, the first and second power circuits operate, the comparing circuit outputs a first control signal to the first and third switch circuits according to the voltage of the non-inverting input terminal, the first and third switch circuits are turned on, the second switch circuit is turned off, the first compensation circuit outputs a first compensation signal to the PWM controller through the first switch circuit, the PWM controller regulates duty cycle of pulse signals and outputs the regulated pulse signals to the first and second power circuits, to provide a stable voltage to the CPU; when the computer is powered off, the first power circuit operates and the second power circuit does not operate, the comparing circuit outputs a second control signal to the first and third switch circuits according to the voltage of the non-inverting input terminal, the first and third switch circuits are turned off, the second switch circuit is turned on, the second compensation circuit outputs a second compensation signal to the PWM controller through the second switch circuit, the PWM controller regulates duty cycle of a pulse signal and outputs the regulated pulse signal to the first power circuit, to provide a stable voltage to the CPU.

2. The power supply circuit of claim 1, wherein the first switch circuit comprises first and second electronic switches, a first terminal of the first electronic switch is connected to a first terminal of the second electronic switch and the output terminal of the comparator, a second terminal of the first electronic switch is connected to a first input output (I/O) pin of the PWM controller, a third terminal of the first electronic switch is connected to the first compensation circuit, a second terminal of the second electronic switch is connected to a second I/O pin of the PWM controller, a third terminal of the second electronic switch is connected to the first compensation circuit.

3. The power supply circuit of claim 2, wherein the second switch circuit comprises third to fourth electronic switches, a first terminal of the third electronic switch is connected to a first terminal of the fourth electronic switch and the third switch circuit, a second terminal of the third electronic switch is connected to the first I/O pin of the PWM controller, a third terminal of the third electronic switch is connected to the second compensation circuit, a second terminal of the fourth electronic switch is connected to the second I/O pin of the PWM controller, a third terminal of the fourth electronic switch is connected to the second compensation circuit.

4. The power supply circuit of claim 3, wherein the third switch circuit comprises a fifth electronic switch and a third resistor, a first terminal of the fifth electronic switch is connected to the output terminal of the comparator, a second terminal of the fifth electronic switch is grounded, a third terminal of the fifth electronic switch is connected to first terminals of the third and fourth electronic switches and also connected to the power source through the third resistor.

5. The power supply circuit of claim 4, wherein the first compensation circuit comprises fourth to sixth resistors and first to third capacitors, a first end of the first capacitor is connected to the third terminal of the first electronic switch, a second end of the first capacitor is connected to the third terminal of the second electronic switch through the fourth and fifth resistors and the third capacitor, a first end of the second capacitor is connected to the third terminal of the first electronic switch, a second end of the second capacitor is connected to a node between the fourth and fifth resistors, a first end of the sixth resistor is connected to the third terminal of the second electronic switch, a second end of the sixth resistor is connected to a node between the fourth and fifth resistors, a feedback pin of the PWM controller is connected to a node between the fourth and fifth resistors.

6. The power supply circuit of claim 5, wherein the second compensation circuit comprises seventh to ninth resistors and fourth to sixth capacitors, a first end of the fourth capacitor is connected to the third terminal of the third electronic switch, a second end of the fourth capacitor is connected to the third terminal of the fourth electronic switch through the seventh and eighth resistors and the sixth capacitor, a first end of the fifth capacitor is connected to the third terminal of the third electronic switch, a second end of the fifth capacitor is connected to a node between the seventh and eighth resistors, a first end of the ninth resistor is connected to the third terminal of the fourth electronic switch, a second end of the ninth resistor is connected to a node between the seventh and eighth resistors, the feedback pin of the PWM controller is connected to a node between the seventh and eighth resistors.

7. The power supply circuit of claim 6, wherein the voltage of the node between the first and the second resistor is less than the voltage of the reference power source when the computer is powered off.

8. The power supply circuit of claim 7, wherein resistances of the seventh to ninth resistors are different from resistances of the fourth to sixth resistors, capacitances of the fourth to sixth capacitors are different from capacitances of the first to third capacitors.

9. The power supply circuit of claim 8, wherein the first to fifth electronic switches are n-channel field effect transistors (FETs), the first to third terminals of the first to fifth electronic switches correspond to gates, sources, and drains of the FETs.

* * * * *